US010479187B2

(12) United States Patent
Lubben et al.

(10) Patent No.: US 10,479,187 B2
(45) Date of Patent: Nov. 19, 2019

(54) INTEGRATED HYBRID POWER SYSTEM FOR WORK VEHICLE

(71) Applicant: Deere & Company, Moline, IL (US)

(72) Inventors: Jeffrey L. Lubben, Hudson, IA (US); Andrew K. Rekow, Cedar Falls, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 15/825,520

(22) Filed: Nov. 29, 2017

(65) Prior Publication Data

US 2019/0160936 A1 May 30, 2019

(51) Int. Cl.

| | |
|---|---|
| ***B60K 6/36*** | (2007.10) |
| ***B60K 6/54*** | (2007.10) |
| ***F02B 63/04*** | (2006.01) |
| ***B60K 6/387*** | (2007.10) |
| ***B60W 20/30*** | (2016.01) |
| ***F02B 61/06*** | (2006.01) |

(52) U.S. Cl.

CPC .................. *B60K 6/54* (2013.01); *B60K 6/36* (2013.01); *B60K 6/387* (2013.01); *B60W 20/30* (2013.01); *F02B 61/06* (2013.01); *F02B 63/04* (2013.01)

(58) Field of Classification Search

CPC .................................... B60K 6/54; B60K 6/36

See application file for complete search history.

(56) References Cited

U.S. PATENT DOCUMENTS

| | | | | |
|---|---|---|---|---|
| 3,062,073 | A | 11/1962 | Brass | |
| 3,150,544 | A | 9/1964 | Brass | |
| 4,862,009 | A | 8/1989 | King | |
| 4,926,713 | A | 5/1990 | Madill | |
| 5,033,994 | A | 7/1991 | Wu | |
| 5,856,709 | A * | 1/1999 | Ibaraki | B60W 20/10 290/45 |
| 6,409,622 | B1 | 6/2002 | Bolz et al. | |

(Continued)

FOREIGN PATENT DOCUMENTS

| | | | |
|---|---|---|---|
| DE | 19927521 | A1 | 6/2000 |
| DE | 19911924 | A1 | 9/2000 |

(Continued)

OTHER PUBLICATIONS

German Search Report for application No. 102018221495.6 dated May 28, 2019.

(Continued)

*Primary Examiner* — Brian L Swenson

(74) *Attorney, Agent, or Firm* — Klintworth & Rozenblat IP LLP

(57) ABSTRACT

An integrated hybrid power system for a work vehicle includes an engine and an electric machine. The power system also includes a transmission configured to transfer mechanical power between the engine and the electric machine. The transmission, in a first configuration, is configured to transfer mechanical power in a first direction from the electric machine to the engine to start the engine. Furthermore, the transmission, in a second configuration, is configured to transfer mechanical power in the first direction and, alternatively, in a second direction from the engine to the electric machine after the engine is started.

17 Claims, 6 Drawing Sheets

106 100 110 118 114 112 ELEC. ENGINE E-MACHINE 116 104 104 102

(56) References Cited

U.S. PATENT DOCUMENTS 6,484,596 B2 11/2002 Puchas
6,832,970 B2 12/2004 Eibler
7,503,871 B2 3/2009 Kozarekar et al.
7,780,562 B2 8/2010 King et al.
8,226,517 B2 7/2012 Tsai
8,235,859 B2 8/2012 Yun
8,734,281 B2 5/2014 Ai
9,145,136 B2 9/2015 Suntharalingam
9,261,064 B2 2/2016 Patel
9,371,810 B2 6/2016 Creviston
9,421,855 B2 8/2016 Suntharalingam
9,541,172 B1 1/2017 Wright
2002/0033059 A1 3/2002 Pels et al.
2002/0177504 A1 11/2002 Pels et al.
2003/0001391 A1 1/2003 Kuang
2003/0104900 A1 6/2003 Takahashi
2003/0224888 A1 12/2003 Wilder
2004/0116226 A1 6/2004 Baker et al.
2007/0157899 A1 7/2007 Seufert
2007/0265126 A1 11/2007 Janson
2008/0179119 A1 7/2008 Grenn et al.
2009/0055061 A1 2/2009 Zhu
2010/0029428 A1 2/2010 Abe
2010/0063704 A1 3/2010 Okubo
2010/0076634 A1 3/2010 Brigham
2011/0010031 A1 1/2011 Syed et al.
2011/0053729 A1 3/2011 Parsons et al.
2011/0070999 A1 3/2011 Soliman et al.
2011/0263379 A1 10/2011 Liang et al.
2012/0103293 A1 5/2012 Robinette et al.
2012/0235473 A1 9/2012 Jiang
2012/0240723 A1 9/2012 Gluckler et al.
2013/0046427 A1 2/2013 Hohenberg
2013/0252773 A1* 9/2013 Suntharalingam ..... B60K 6/387 475/5
2013/0316873 A1 11/2013 Jansen et al.
2014/0137824 A1 5/2014 Jacques et al.
2014/0150604 A1 6/2014 Kaltenbach
2014/0256490 A1 9/2014 Honda
2015/0239335 A1 8/2015 Wachter
2016/0031438 A1 2/2016 Matsui
2016/0052382 A1* 2/2016 Clark ....................... B60K 6/26 477/5
2016/0076629 A1 3/2016 Modrzejewski et al.
2016/0082821 A1 3/2016 Mueller et al.
2016/0137045 A1* 5/2016 Zhu .................... F16H 37/0806 475/5
2016/0288780 A1* 10/2016 Shukla .................. B60W 20/10
2017/0248196 A1 8/2017 Turner et al.
2018/0100564 A1 4/2018 Fliearman et al.
2018/0106365 A1* 4/2018 Tsukizaki ................. B60K 6/36
2018/0186230 A1* 7/2018 Fukuda .................. B60K 6/442
2018/0236864 A1* 8/2018 Imamura ............... B60K 6/365
2019/0219022 A1 7/2019 Patil et al.

FOREIGN PATENT DOCUMENTS

DE 19923316 A1 11/2000
DE 102008045202 A2 1/2001
DE 102006037576 A1 4/2008
DE 102010030570 A1 12/2011
DE 102010030571 A1 12/2011
DE 102010060140 A1 4/2012
DE 102011080068 A1 1/2013
DE 102011089708 A1 6/2013
DE 102011089709 A1 6/2013
DE 102011089710 A1 6/2013
DE 112011103973 T5 10/2013
DE 102013203009 A1 8/2014
DE 102013206970 A1 10/2014
DE 102014200720 B3 2/2015
DE 102014200723 B3 2/2015
DE 102017203026 A1 8/2017
DE 102017204269 A1 9/2017
EP 1069310 A2 1/2001
EP 2272702 A2 1/2011
JP 2015116004 A 6/2015
WO 200700107458 A2 9/2007

OTHER PUBLICATIONS

Deere & Company, Bi-Directional Integrated Starter-Generator Device, U.S. Appl. No. 16/385,784, filed Apr. 16, 2019.
Deere & Company, Multi-Mode Integrated Starter-Generator Device, U.S. Appl. No. 16/385,860, filed Apr. 16, 2019.
Deere & Company, Multi-Mode Integrated Starter-Generator Device With Preloaded Clutch, U.S. Appl. No. 16/385,892, filed Apr. 16, 2019.
Deere & Company, Multi-Mode Integrated Starter-Generator Device With Magnetic Cam Assembly, U.S. Appl. No. 16/385,934, filed Apr. 16, 2019.
Deere & Company, Multi-Mode Integrated Starter-Generator Device With Cam Arrangement, U.S. Appl. No. 16/385,964, filed Apr. 16, 2019.
Deere & Company, Multi-Mode Integrated Starter-Generator Device With Dog Clutch Arrangement, U.S. Appl. No. 16/385,989, filed Apr. 16, 2019.
Deere & Company, Multi-Mode Starter-Generator Device Transmission With Single Valve Control, U.S. Appl. No. 16/386,001, filed Apr. 16, 2019.
Deere & Company, Multi-Mode Integrated Starter-Generator Device With Electromagnetic Actuation Assembly, U.S. Appl. No. 16/386,020, filed Apr. 16, 2019.
Deere & Company, Multi-Mode Integrated Starter-Generator Device With Transmission Assembly Mounting Arrangement, U.S. Appl. No. 16/386,052, filed Apr. 16, 2019.
Deere & Company, Multi-Mode Integrated Starter-Generator Device With Solenoid Cam Actuation Apparatus, U.S. Appl. No. 16/386,075, filed Apr. 16, 2019.
Harmonic Drive LLC, Harmonic Planetary Precision Gearing & Motion Control, Product Brochure, Mar. 2006.
NTN Automotive Sales Headquarters, Compact Clutch Integrated Pulley for Alternators, NTN Technical Review No. 75, 2007.
North Atalantic Starter, Starter Drives Explained, Northatlan.com, 2005.
Ioan-Adrian Viorel et al., Integrated Starter-Generators For Automotive Applications, Technical University of Cluj-Romania, Department of Electrical Machines, vol. 45, No. 3, 2004.
USPTO Non-Final Office Action dated Nov. 2, 2017 for U.S. Appl. No. 15/056,767.
USPTO Non-Final Office Action dated Sep. 28, 2018 for U.S. Appl. No. 15/056,767.
USPTO Non-Final Office Action dated Feb. 25, 2019 for U.S. Appl. No. 15/834,356.
USPTO Final Office Action dated Jun. 11, 2018 for U.S. Appl. No. 15/056,767.
USPTO Final Office Action dated Mar. 8, 2019 for U.S. Appl. No. 15/056,767.
German Search Report for application No. 1020172030267 dated Aug. 4, 2017.
German Search Report for application No. 1020182189080 dated May 27, 2019.
German Search Report for application No. 1020182180784 dated Jun. 4, 2019.

* cited by examiner

OFFBOARD POWER
257
OFFBOARD POWER
259
INVERTER 3
256
INVERTER 4
258
INVERTER 1
252
250
CONVERTER 4
248
CONVERTER 3
246
CONVERTER 2
244
CONVERTER 1
242
BATT 4
238
BATT 3
236
BATT 2
234
BATT 1
232
261
253
OFFBOARD POWER
255
FAN
263
210
240
212
275
273
271
274
272
286
282
284
286
288
216
214
MG 1
220
290
278
276
270
292
202
AXLE
226

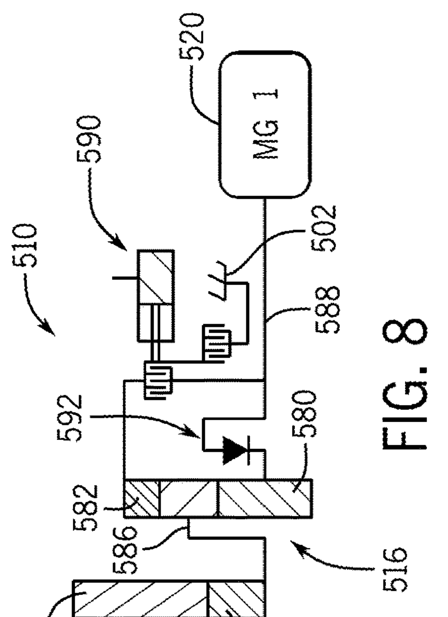
FIG. 8
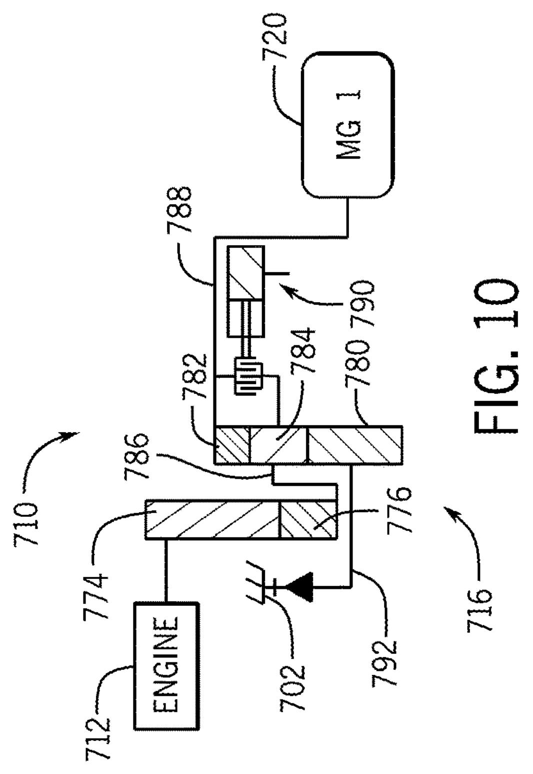
FIG. 10
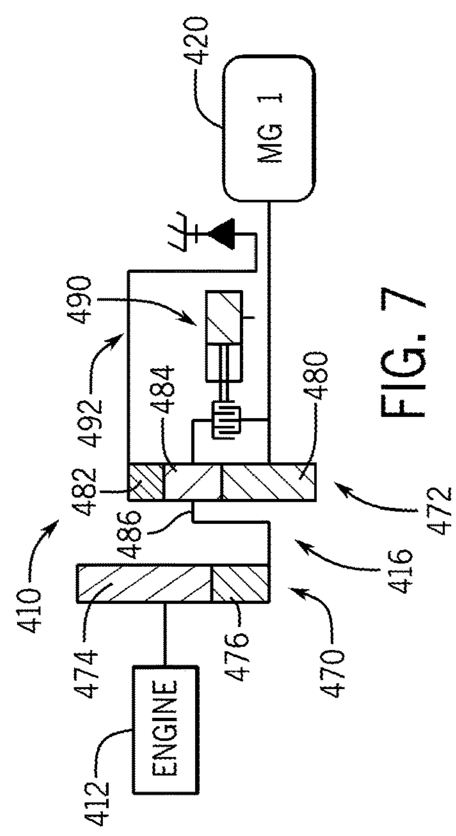
FIG. 7
620
MG 1
672
682
688
684
674
680
670
690
686
676
691
616
ENGINE
610
612
602
692
FIG. 9

INTEGRATED HYBRID POWER SYSTEM FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle power trains and, more particularly, to an integrated hybrid power system for a work vehicle.

BACKGROUND OF THE DISCLOSURE

Work vehicles (e.g., agriculture, construction, and forestry work vehicles) and other conventional vehicles may be powered by an internal combustion engine, such as a diesel engine. It is becoming more common for vehicles to include two or more mixed power sources, such as an engine and one or more electric motors. In most cases, the engine remains the primary power source of the work vehicle. The engine typically requires mechanical input from a starter to initiate rotation of the crankshaft, and thereby reciprocation of the pistons within the cylinders.

Furthermore, to power electrical subsystems of the work vehicle, a portion of the engine power may be harnessed using an alternator to generate power. The battery or batteries of the work vehicle may be charged by the alternator as well.

SUMMARY OF THE DISCLOSURE

An integrated hybrid power system for a work vehicle is disclosed that includes an engine and an electric machine. The power system also includes a transmission configured to transfer mechanical power between the engine and the electric machine. The transmission, in a first configuration, is configured to transfer mechanical power in a first direction from the electric machine to the engine to start the engine. Furthermore, the transmission, in a second configuration, is configured to transfer mechanical power in the first direction and, alternatively, in a second direction from the engine to the electric machine after the engine is started.

Also, a method of operating an integrated hybrid power system of a work vehicle that includes a transmission disposed between an engine and an electric machine is disclosed. The method includes operating, with the transmission in a first configuration, the electric machine as a motor to transfer mechanical power in a first direction through the transmission from the electric machine to the engine to start the engine. The method further includes changing the transmission from the first configuration to a second configuration for allowing power transfer in the first direction and, alternatively, in a second direction from the engine to the electric machine after the engine is started.

Furthermore, a work vehicle is disclosed that includes an internal combustion engine, an electric machine, and a transmission with a first driveline component and a second driveline component arranged in-series between the internal combustion engine and the electric machine. The transmission is configured to transfer mechanical power between the engine and the electric machine. The first driveline component has a fixed drive ratio, and the second driveline component has a variable drive ratio. The second driveline component, when the transmission is in a first configuration, is configured to provide a gear reduction to the transmission for transferring mechanical power in a first direction from the electric machine to the engine to start the engine. The second driveline component, when the transmission is in a second configuration, is configured to provide a direct drive allowing the transmission to transfer mechanical power in the first direction and, alternatively, in a second direction from the engine to the electric machine after the engine is started.

The details of one or more implementations are set forth in the accompanying drawings and the description below. Other features and advantages will become apparent from the description, the drawings, and the claims.

BRIEF DESCRIPTION OF THE DRAWINGS

FIG. 7 is a schematic view power system according to additional embodiments of the present disclosure;

FIG. 8 is a schematic view of the power system according to additional embodiments of the present disclosure;

FIG. 9 is a schematic view of the power system according to additional embodiments of the present disclosure; and FIG. 10 is a schematic view of the power system according to additional embodiments of the present disclosure.

Like reference symbols in the various drawings indicate like elements.

DETAILED DESCRIPTION

Figure 1:
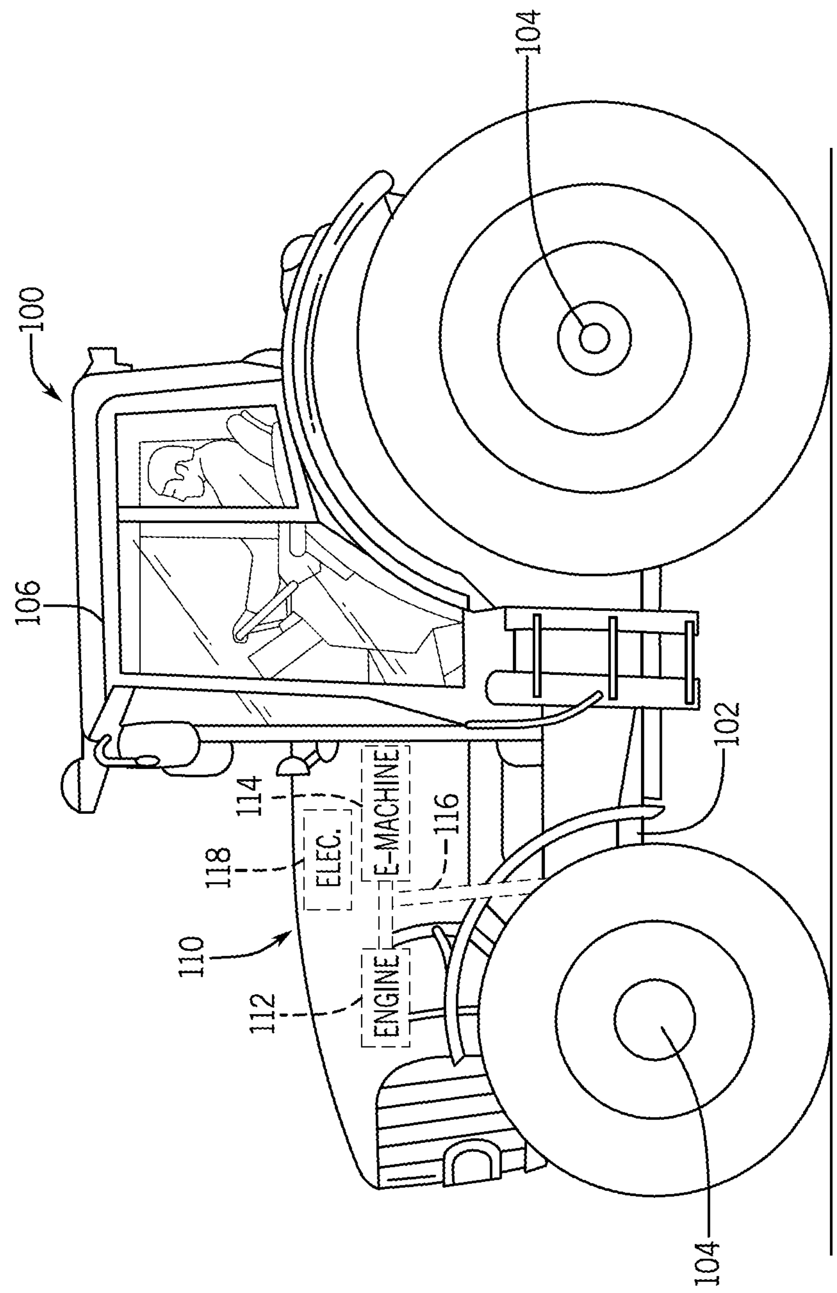
FIG. 1 is a side view of an example work vehicle that may include an integrated hybrid power system of the present disclosure.

The following describes one or more example embodiments of the disclosed integrated hybrid power system as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

In the discussion below, various example configurations of shafts, gears, and other mechanical power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

As used herein, "direct" or "directly" may be used to indicate power transmission between two system elements without an intervening conversion of the power to another form. For example, mechanical (rotational) power may be considered as "directly" transmitted by a power source (e.g., an engine, a motor, etc.) to an output component if the power is transferred via a number of shafts, clutches, and gears (e.g., various spur, bevel, summing or other gears) without being converted to electrical power by a generator.

In contrast, power may not be considered as "directly" transmitted between two system elements if some portion of the power is converted to another form during transmission. For example, mechanical power may be considered "indirectly" transmitted between the engine, motor, etc. and the output component if a portion of the power is converted to electrical power by a generator, even if that portion is later reconverted to mechanical power.

Also, as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

For convenience of notation, "component" may be used herein, particularly in the context of a planetary gear set, to indicate an element for transmission of power, such as a sun gear, a ring gear, or a planet gear carrier. In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

In some fuel/electric hybrid work vehicles, the motive power source for the vehicle may alternate between an engine (e.g., a diesel engine) and an electric motor. In additional embodiments, engine power may be supplemented by electric motor power. In still other vehicles the electric system may be used solely to initiate engine start up and to run the non-drive electrical systems of the vehicle.

Furthermore, a starter motor (e.g., an electrical motor) may be included in some vehicles for starting the engine, specifically, by turning the engine crankshaft to move the pistons within the cylinders. Once the engine is operating, the electrical system of some vehicles may harvest the engine power to power the electrical system as well as to charge the battery. Typically, this power harvesting is done using an alternator.

In certain applications, such as in certain heavy-duty machinery and work vehicles, it may be disadvantageous to include separate starter and alternator components. For example, the starter and/or alternator components may be too bulky for some work vehicles. Also, the separate components may increase manufacturing expenses.

Accordingly, the following describes one or more example implementations of an improved integrated hybrid power system for a work vehicle. In one aspect, the disclosed power system includes a combination or integrated device that may be configured for performing the engine-cranking function of a conventional starter motor. Furthermore, the integrated device may be configured for performing the power-generating function of a conventional generator or alternator. Moreover, the integrated device may be configured for off-boarding electrical power, for example, to drive implements (e.g., seeders, planters, etc.). In addition, the integrated device may be configured for recirculating power within the vehicle drive train. Also, the integrated device may be configured for supplying electrical power to batteries, for example, for use during high power demand transient events.

In some aspects, the present disclosure relates to an integrated hybrid power system for a work vehicle with an engine, an integrated electrical device (i.e., a motor/generator (MG)), and a transmission configured to transfer mechanical power between the engine and the integrated electrical device. The transmission may transmit mechanical power between the engine and the electrical device. The transmission may have a first configuration, in which power from the electrical device is transferred to the engine, for example, to start the engine. The transmission may also have a second configuration for use after the engine is started. In the second configuration of the transmission, mechanical power may transfer either from the engine to the electrical device or from the electrical device to the engine.

The drive ratio (i.e., gear ratio) of the transmission provided in the first configuration may be different to the drive ratio provided in the second configuration. For example, when starting the engine (first configuration), the transmission may provide a relatively high gear reduction (low drive ratio) to provide high torque from the electrical device to the engine. In contrast, once the engine is started (second configuration), the transmission may provide a higher drive ratio, allowing the electric device to generate electrical power, to supplement mechanical power from the engine, etc.

Further, in certain embodiments, the transmission may automatically shift drive ratios (i.e., shift between power flow paths having different drive ratios). The shifting may occur according to the direction in which torque is applied (i.e., transmitted) through the transmission.

In some embodiments, the transmission may include one or more variable engagement components, such as one or more clutches. For example, there may be a passive engagement component, such as a one-way clutch. Furthermore, there may be an active engagement component, such as a hydraulic clutch with a control system configured to actively change the hydraulic clutch between an engaged position and a disengaged position. The engagement component(s) may be used to route power through the transmission or to otherwise affect power transfer through the transmission.

Referring FIG. 1, an example work vehicle of the present disclosure is depicted as an agricultural tractor. It will be understood, however, that other configurations may be possible, including configurations with the work vehicle 100 as a different kind of tractor, or as a work vehicle used for other aspects of the agriculture industry, for the construction, or for the forestry industries (e.g., a harvester, a log skidder, a motor grader, and so on).

As is known, the work vehicle 100 has a main frame or chassis 102 supported off the ground by ground-engaging wheels 104. The chassis 102 may support an operator cabin 106, which may include an operator interface and controls (e.g., various joysticks, switches, levers, buttons, touch-screens, keyboards, speakers and microphones associated with a speech recognition system).

The chassis 102 may also support an integrated hybrid power system 110. The system 110 may provide, generate, and distribute mechanical and electrical power to various components of the work vehicle 100. Also, in some embodiments, the power system 110 may off-board mechanical and/or electrical power to another vehicle, such as a towed vehicle.

The power system 110 may include an internal combustion engine 112 and at least one electric machine 114 (e-machine). The internal combustion engine 112 may be a diesel engine in some embodiments. The e-machine 114 may operate as a motor as well as a generator as will be discussed. The e-machine 114 may produce AC or DC power without departing from the scope of the present disclosure. Thus, as used herein, the term "generator" shall mean producing electric power of static or alternating polarity (i.e., AC or DC). The engine 112 and the e-machine 114 may also be connected or may include a respective control system, such as a computerized controller with a processor that controls its operation.

The power system 110 may further support a transmission 116. In some embodiments, the transmission 116 may be configured to transfer mechanical power between the engine 112 and the e-machine(s) 114. Furthermore, in some embodiments, the transmission 116 may supply mechanical power to another component, such as an axle of the wheels 104 and/or to an on-board or off-board implement or other component. In some embodiments, the transmission 116 may supply mechanical power to an off-board implement via a power take-off (PTO) device.

Those having ordinary skill in the art will understand that the e-machine 114 may be disposed before or after any transmission components that provide power to the wheels 104 (e.g., before or after any transmission components to axle(s) of the wheels 104). Also, the at least one e-machine 114 may be directly connected to the engine 112 as will be discussed.

Additionally, the power system 110 may include an electronics system 118. The electronics system 118 may include a plurality of batteries, inverters, converters, wiring and other electric components as will be discussed in greater detail below.

Figure 2:
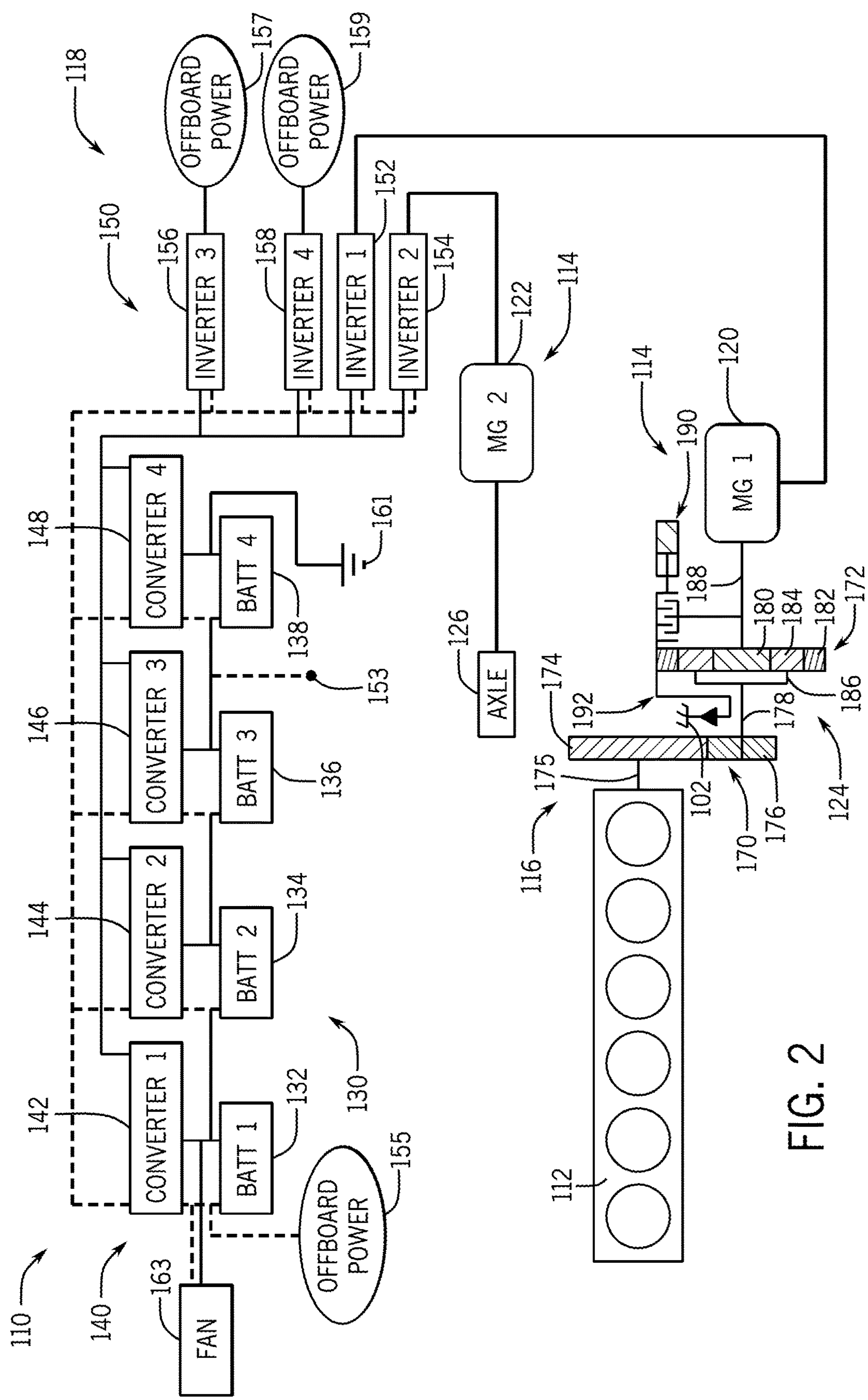
FIG. 2 is a schematic view of the integrated hybrid power system according to example embodiments of the present disclosure.

Referring now to FIG. 2, the power system 110 is illustrated in greater detail. It will be appreciated that this is an example embodiment, and that the power system 110 may vary from the illustrated embodiment without departing from the scope of the present disclosure.

As shown, the "at least one e-machine" 114 discussed above may include a first e-machine 120 and a second e-machine 122. In some embodiments, the first e-machine 120 may be mechanically and directly connected to the engine 112 via one or more driveline components 124. The driveline components 124 may include one or more gear sets, chain-driven sprockets, shafts, and/or other members configured to rotate for transferring mechanical power. It will be appreciated that the driveline component(s) 124 may be considered part of (or may define) the transmission 116 as described above. Furthermore, the second e-machine 122 may be mechanically and directly connected to the wheels 104 (FIG. 1) of the work vehicle via an axle 126. It will be appreciated that the axle 126 may be considered part of the transmission 116 as described above.

Also, as shown in FIG. 2, the first e-machine 120 may be electrically connected to the second e-machine 122 via wiring, a plurality of inverters 150, and/or other components of the electronics system 118. In some embodiments, the plurality of inverters 150 may include a first inverter 152, a second inverter 154, a third inverter 156, and a fourth inverter 158. The first and second inverters 152, 154 may be directly connected so as to electrically connect the first e-machine 120 and the second e-machine 122.

The electronics system 118 may further include one or more batteries 130, such as a first battery 132, a second battery 134, a third battery 136, and a fourth battery 138. In some embodiments, the batteries 130 may each be twelve volt (12V) batteries. The electronics system 118 may also include one or more converters 140, such as a first converter 142, a second converter 144, a third converter 146, and a fourth converter 148. In some embodiments, the converters 140 may each be twelve to seven hundred (12-700) DC-to-DC converters. The batteries 130, converters 140, and inverters 150 may be electrically connected to provide AC and/or DC to a variety of devices, outlets, etc.

Figure 3:
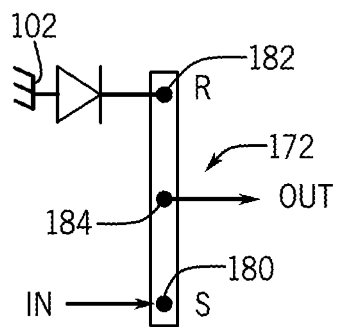
FIG. 3 is a schematic illustration of power flow through the power system of FIG. 2 in a first configuration.
Figure 4:
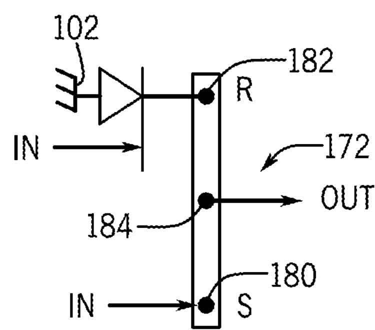
FIG. 4 is a schematic illustration of power flow through the power system of FIG. 2 in a second configuration.

For example, the electronics system 118 may provide power to a fan 163 (e.g., an electrical motor of a fan used for cooling). Also, the electronics system 118 may provide power to a first power connector 153, a second power connector 155, a third power connector 157, and a fourth power connector 159. The first power connector 153 may provide onboard electrical power, whereas the second, third and fourth power connectors 155, 157, 159 may be configured for off-boarding electrical power. The electronics system 118 may also include a grounding connection 161 as well. In some embodiments, the first electrical connector may provide twelve volts (12V) and the second electrical connector 155 may provide forty-eight volts (48V). The third and fourth electrical connectors 157, 159 may provide four hundred eighty volts AC (480V AC) or seven hundred volts DC (700V DC) in some embodiments. Referring now to FIGS. 2, 3, and 4, the driveline component(s) 124 will be discussed according to example embodiments. In some embodiments, the driveline component(s) 124 may include a first driveline component 170 and a second driveline component 172 arranged in series between the engine 112 and the first e-machine 120. The first driveline component 170 may be a gear set (i.e., a first gear set) in some embodiment. Also, the second driveline component 172 may be a gear set (i.e., a second gear set) in some embodiments.

The first driveline component 170 may include a first drive member 174, such as a spur gear, which is mounted on an engine shaft 175 of the engine 112. The first driveline component 170 may also include a second drive member 176, such as a spur gear, which is mounted on a parallel shaft 178 and which is enmeshed with the first drive member 174. In some embodiments, the first driveline component 170 may provide a fixed (i.e., unchanging, constant, etc.) drive ratio between the engine shaft 175 and the parallel shaft 178. For example, in some embodiments, the first driveline component 170 has a 3:1 drive ratio. In another embodiment, the first driveline component 170 has a 4:1 drive ratio.

The second driveline component 172 may be (or may include) a planetary gear set with a sun gear 180, a ring gear 182, and a plurality of planet gears 184 with an associated carrier 186. The sun gear 180 may be referred to as a first drive member of the second driveline component 172, the planet gears 184 may be referred to as second drive members, and the ring gear 182 may be referred to as a third drive member of the second driveline component 172. The planet gears 184 may be disposed between the sun and ring gears 180, 182 and may be enmeshed with both. Also, the carrier 186 may be rotationally fixed to the parallel shaft 178. The sun gear 180 may be rotationally fixed to a shaft 188 of the first e-machine 120. As will be discussed, the second driveline component 172 may have a variable drive ratio.

The power system 110 may further include a selective (active) transmission component, such as a clutch 190. The clutch 190 may be a hydraulic clutch in some embodiments, although it will be appreciated that the clutch 190 may be a mechanical or electrical clutch in some embodiments. The clutch 190 may include an ON/OFF solenoid valve, a variable pressure valve, or other controls for changing the clutch 190 between an disengaged position and an engaged position. The position of the clutch 190 may be selected and controlled by a control system (e.g., a computerized control system with a processor, a hydraulic control system, etc.). In some embodiments, the sun gear 180, planet gears 184, and ring gears 182 may rotate relative to each other when the clutch 190 is in the disengaged position. Alternatively, in some embodiments when the clutch 190 is in the engaged position, the sun gear 180 and the ring gear 182 may be rotationally fixed together, and the planet gears 184 and carrier 186 may rotate relative to the sun and ring gears 180, 182.

In some embodiments, the clutch 190 may include one or more biasing members that biases the clutch 190 toward the engaged position and away from the disengaged position. Also, the clutch 190 may include an actuator that disengages the clutch, against the biasing force provided by the biasing member(s). Accordingly, the engaged position may be the default position of the clutch 190.

Furthermore, the power system 110 may include a one-way transmission component, such as a one-way clutch 192. In some embodiments, the one-way clutch 192 may be connected to the ring gear 182 and to the chassis 102. The one-way clutch 192 may have an engaged position, allowing torque to flow from the ring gear 182 to the chassis 102, causing the ring gear 182 to be fixed relative to the chassis 102. In other words, the ring gear 182 may be grounded to the chassis 102 when the one-way clutch 192 is in the engaged position. The one-way clutch 192 may have a disengaged, overrunning position preventing torque transfer in the opposite direction. The one-way clutch 192 may automatically switch between the engaged position and the disengaged position according to the relative speed of the transmission components.

The second driveline component 172 may provide a variable drive ratio between the shaft 188 and the shaft 178. In other words, the second driveline component 172 may provide a plurality of discrete and different drive ratios. For example, in some embodiments, when the clutch 190 is disengaged and power flows from the shaft 188 toward the shaft 178, the second driveline component 172 may have a 3:1 drive ratio or a 4:1 drive ratio. Also, in some embodiments, when the clutch 190 is engaged, the second driveline component 172 may have a 1:1 drive ratio (i.e., no gear reduction or direct drive).

Operations of the power system 110 will now be discussed according to example embodiments. When starting the engine 112, for example, the first e-machine 120 may draw electrical power from the electronics system 118. In some embodiments, voltage from the batteries 130 (e.g., from 12V to 48V) may be increased (e.g., to 700V). The first e-machine 120, may convert the electrical power to mechanical power, and transfer the mechanical power to the engine 112 via the driveline component(s) 124. Once the engine 112 is started, the engine 112 may drive power back through the driveline component(s) 124 such that the first e-machine 120 generates power. The generated power may be supplied to the second e-machine 122 for driving the axle 126. Electrical power generated by the first e-machine 120 may also be stored in the batteries 130. Additionally, power generated by the first e-machine 120 may be supplied to onboard electrical devices (e.g., the fan 163 or another component connected at the first connector 153). Moreover, power generated by the first e-machine 120 may be supplied to offboard electrical devices (e.g., components connected at the second, third, or fourth connectors 155, 157, 159).

More specifically, as shown in FIGS. 2 and 3, when starting the engine 112, the transmission may be in a first configuration, wherein the clutch 190 is disengaged. The first e-machine 120 may provide mechanical power to the sun gear 180. The one-way clutch 192 may be in the engaged position, thereby fixing the ring gear 182 relative to the chassis 102. Accordingly, power from the first e-machine 120 may be transferred from the sun gear 180, to the planet gears 184 and carrier 186, and to the shaft 178. The second driveline component 172 may also provide a gear reduction (e.g., 3:1 or 4:1 gear reduction) for the power transferred from the shaft 188 to the shaft 178. Power at the shaft 178 may be transferred to the engine 112 via the first driveline component 170. The first driveline component 170 may also provide a gear reduction (e.g., a 3:1 or 4:1 gear reduction) for this power transfer. Accordingly, the first and second driveline components 170, 172 may each provide a gear reduction such that the first e-machine 120 provides sufficiently high torque to start the engine 112.

As the engine 112 starts, the ring gear 182 may eventually begin to rotate in the opposite direction, allowing the one-way clutch 192 to overrun and disconnect the engine 112 and the first e-machine 120. The clutch 190 may engage, thereby rotationally fixing the ring gear 182 and the sun gear 180 together (FIG. 4). The clutch 190 may remain engaged as long as the engine 112 is operating. In other words, this may represent a default position of the second driveline component 172 once the engine 112 is running.

As such, mechanical power from the engine 112 may flow via the first driveline component 170 to the planet gears 184 of the second driveline component 172. The planet gears 184 may rotate the rotationally fixed ring gear 182 and sun gear 180 to transfer power to the first e-machine 120. The first e-machine 120 may, in turn, generate electric power from the mechanical power supplied from the engine 112. The generated power may be supplied to the second e-machine 122 for driving the axle 126. Power generated at the first e-machine 120 may also be supplied to the batteries 130, to the fan 163 or other onboard electrical devices at the connector 153, or to offboard device(s) at the connectors 155, 157, 159.

Additionally, with the engine 112 started and the clutch 190 engaged, the first e-machine 120 may output mechanical power back through the driveline components 124 such that the first e-machine 120 operates as a motor. Power from the first e-machine 120 may flow from the shaft 188 to the sun gear 180, which is rotationally fixed to the ring gear 182. This power may transfer (e.g., at a 1:1 drive ratio) to the planet gears 184 and the associated carrier 186 to the shaft 178, to the drive member 176, to the drive member 174, and to the engine shaft 175. Thus, in some embodiments, power from the first e-machine 120 may be used to brake the engine shaft 175.

In the embodiment shown in FIG. 2, motive power to the axle 126 is supplied from the second e-machine 122. Thus, mechanical power from the engine 112 may be supplied to the first e-machine 120, which converts the mechanical power to electrical power. Electrical power from the first e-machine 120 may be supplied to the second e-machine 122, which may output mechanical power to the axle 126. This represents a so-called series-electric power flow. However, the power system 110 may be differently configured without departing from the scope of the present disclosure.

Figure 5:
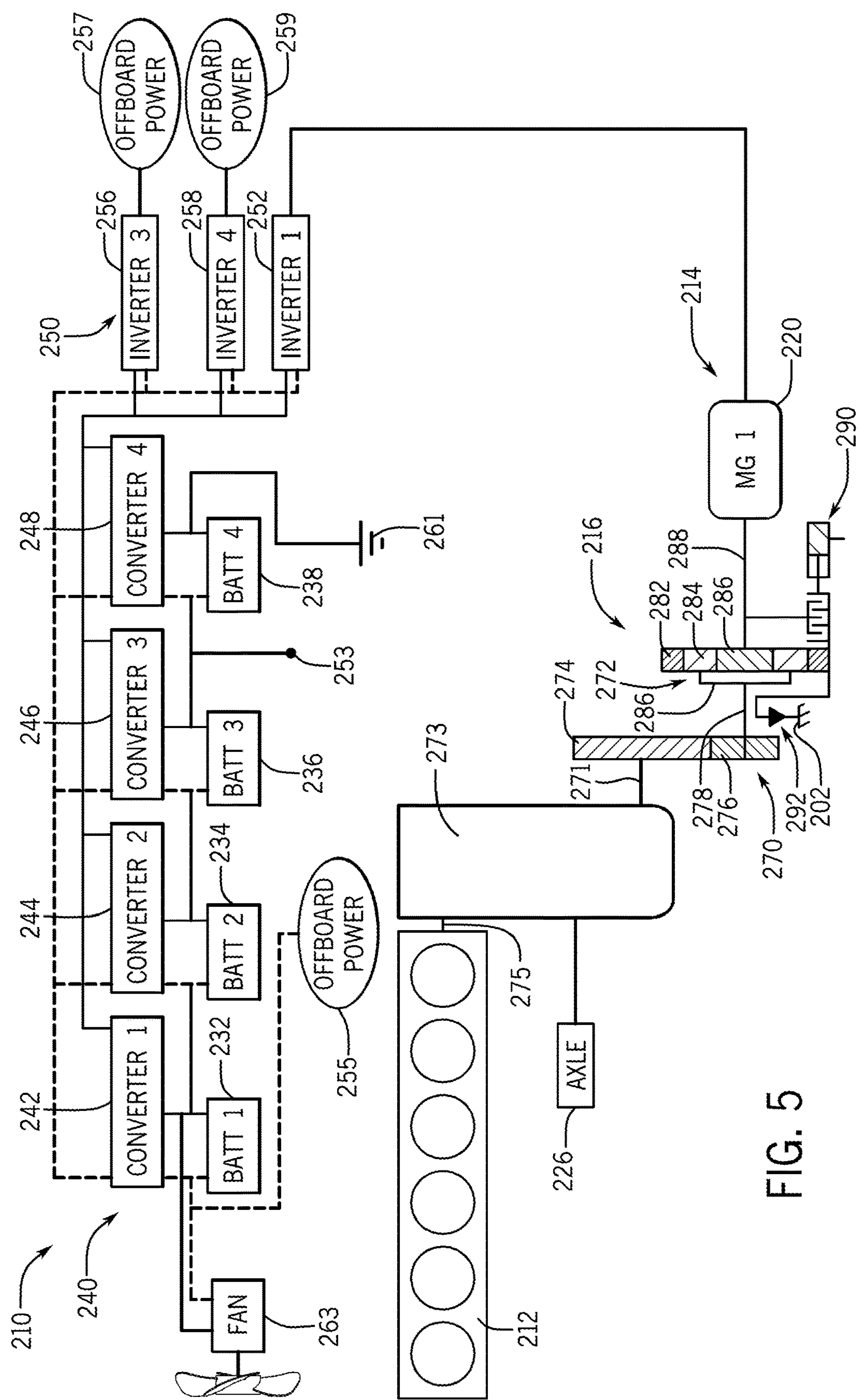
FIG. 5 is a schematic view of the power system according to additional embodiments of the present disclosure.

For example, FIG. 5 shows the power system 210 according to another example embodiment. The power system 210 may include several features that are similar to those of FIG. 2 except as noted below. Also, components that correspond to those of FIG. 2 are indicated with corresponding reference numbers increased by 100. A description of those common components will not be repeated for purposes of brevity.

The power system 210 may include the first e-machine 220. The first e-machine 220 may be electrically connected to the electronics system 118. The electronics system 118 may be substantially similar as shown in FIG. 2 and described above, except the inverters 250 may include the first, third, and fourth inverters 252, 258, 256. It will be appreciated, however, that a second e-machine may be included in some embodiments without departing from the scope of the present disclosure.

The e-machine 220 may also include components of the transmission 216. The transmission 216 may include the first driveline component 270 and the second driveline component 272 as discussed above in relation to FIG. 1, except that the drive member 274 of the first driveline component 270 may be rotationally fixed and supported on a shaft 271. Also, the shaft 271 may be operably engaged to an intervening transmission assembly 273. Likewise, the engine shaft 275 may be connected the intervening transmission assembly 273. Additionally, the intervening transmission assembly 273 may include an output for mechanical power, such as the axle 226.

The intervening transmission assembly 273 may comprise a gear train with a discrete (i.e., fixed) drive ratio. In other embodiments, the intervening transmission assembly 273 may include an infinitely variable transmission (IVT). Also, the intervening transmission assembly 273 may be configured for providing a plurality of modes (e.g., a power shifting transmission) for rotating the axle 226 at different ranges of speeds. The assembly 273 may be configured for summing mechanical power at the engine shaft 275 and the shaft 271 and providing the summed power to the axle 226. Furthermore, the intervening transmission assembly 273 may receive and/or deliver mechanical power between the engine 212 and the first e-machine 220.

The first e-machine 220 may operate substantially similar to the embodiments described above. Thus, the first e-machine 220 may be used to start the engine 212 (first configuration) with the clutch 290 in the disengaged position and the one-way clutch 292 in the engaged position, causing mechanical power to transfer via the first and second driveline components 270, 272 to the intervening transmission assembly 273. The intervening transmission assembly 273 may be configured for transferring this power to the engine 212.

Once the engine 212 is started, the one-way clutch 292 may overrun and the clutch 290 may engage, causing the second driveline component 272 to shift to direct drive mode (1:1 drive ratio). This may represent the second (engine started) configuration of the power system 210. In this configuration, the engine 212 may provide motive power, via the intervening transmission assembly 273, to the axle 226. Also, power from the engine 212 may be directed to the first e-machine 220 for generating electrical power. Alternatively, power from the first e-machine 220 may be provided back to the engine 212 and/or the axle 226. In the latter embodiment, power from the first e-machine 220 may be directed to the axle 226 for boosting power provided from the engine 212. In an additional embodiment in which a second e-machine is included, power from the second e-machine may be provided to the e-machine 220, and the e-machine 220 may send power to brake the engine 212 (i.e., engine braking).

Figure 6:
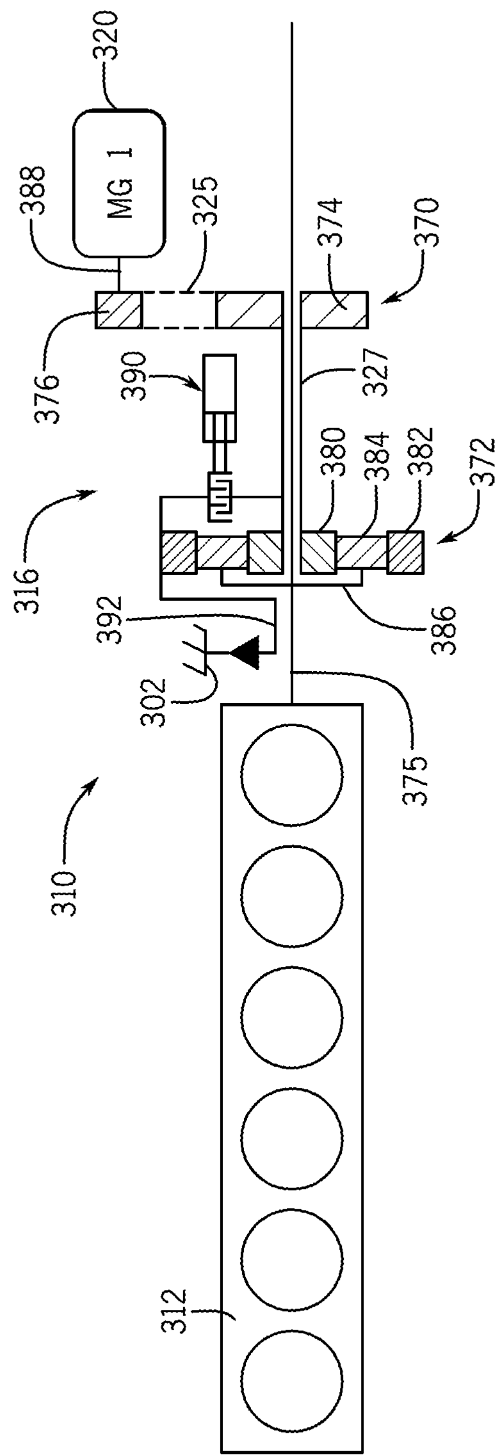
FIG. 6 is a schematic view of the power system according to additional embodiments of the present disclosure.

Referring now to FIG. 6, portions of the power system 310 are shown according to additional example embodiments. The power system 310 may include several features that are similar to those of FIG. 2 except as noted below. Also, components that correspond to those of FIG. 2 are indicated with corresponding reference numbers increased by 200. The embodiment of FIG. 6 may also include one or more features of any of FIGS. 2-5. A description of those common components/features will not be repeated for purposes of brevity.

In the embodiment of FIG. 6, the positions of the first driveline component 370 and the second driveline component 372 may be switched as compared to the embodiment of FIG. 2. As shown, the first driveline component 370 may be disposed between the second driveline component 372 and the first e-machine 320. The second driveline component 372 may be disposed between the first driveline component 370 and the engine 312. Also, the engine shaft 375 may be directly attached to the carrier 386 and the planet gears 384 of the second driveline component 372. Furthermore, the second drive member 376 (i.e., second sprocket) of the first driveline component 370 may be fixedly mounted on the shaft 388 of the first e-machine 320. The second drive member 376 (i.e., second sprocket) may be engaged with the first drive member 374 (i.e., first sprocket) via a chain 325 such that the first and second drive members 374, 376 and the chain 325 define a chain drive. The first drive member 374 (i.e., first sprocket) may be mounted on a shaft 327. The shaft 327 may be substantially co-axial with the engine shaft 375 and may be mounted for rotation relative to the engine shaft 375. Furthermore, the sun gear 380 of the second driveline component 372 may be fixed on the shaft 327. The clutch 390 and the one-way clutch 392 may also be included similar to the embodiment of FIG. 2 with the clutch 390 attached to the shaft 327 and the ring gear 382 and the one-way clutch 392 attached to the ring gear 382 and the chassis 302.

Accordingly, the first e-machine 320 may start the engine 312 in a first configuration of the power system 310. Also, in a second configuration once the engine 312 has started, the power may flow via the transmission 316 from the engine 312 to the first e-machine 320 and, alternatively, from the e-machine 320 toward the engine 312.

Referring now to FIG. 7, portions of the power system 410 are shown according to additional example embodiments. The power system 410 may include several features that are similar to those of FIG. 2 except as noted below. Also, components that correspond to those of FIG. 2 are indicated with corresponding reference numbers increased by 300. The embodiment of FIG. 7 may also include one or more features of any of FIGS. 2-6. A description of those common components/features will not be repeated for purposes of brevity.

As shown, the clutch 490 may be operably connected to the sun gear 480 and the planet gear 484. The first drive member 474 may be an engine ring gear of the engine 412 in some embodiments, and the second drive member 476 may be a pinion gear in some embodiments. Other portions of the transmission 416 may be similar to the embodiments discussed above.

The power system 410 may operate substantially similar to the above embodiments. Thus, the first e-machine 420 may start the engine 412 with the clutch 490 in the disengaged position and the one-way clutch 492 engaged. Once the engine 412 has started, the clutch 490 may move to the engaged position, and the one-way clutch 492 may overrun, allowing power to flow in either direction through the transmission 416.

Referring now to FIG. 8, portions of the power system 510 are shown according to additional example embodiments. The power system 510 may include several features that are similar to those of FIG. 2 except as noted below. Also, components that correspond to those of FIG. 2 are indicated with corresponding reference numbers increased by 400. The embodiment of FIG. 8 may also include one or more features of any of FIGS. 2-7. A description of those common components/features will not be repeated for purposes of brevity.

As shown, the shaft 588 of the first e-machine 520 may be connected, via the one-way clutch 592 to the sun gear 580. Also, the clutch 590 may be operably coupled to the ring gear 582, to the shaft 588, as well as to the chassis 502. Other portions of the transmission 516 may be similar to the embodiments discussed above.

The power system 510 may operate substantially similar to the above embodiments. Thus, the first e-machine 520 may start the engine 512 with the clutch 590 in the disengaged position and the one-way clutch 592 engaged. Once the engine 512 has started, the clutch 590 may move to the engaged position, and the one-way clutch 592 may disengage, allowing power to flow in either direction through the transmission 516.

Referring now to FIG. 9, portions of the power system 610 are shown according to additional example embodiments. The power system 610 may include several features that are similar to those of FIG. 2 except as noted below. Also, components that correspond to those of FIG. 2 are indicated with corresponding reference numbers increased by 500. The embodiment of FIG. 9 may also include one or more features of any of FIGS. 2-8. A description of those common components/features will not be repeated for purposes of brevity.

As shown, the ring gear 682 may be attached to the shaft 688 of the first e-machine 620. Also, the one-way clutch 692 may be attached to the shaft 691 and to the chassis 602. The shaft 691 may be fixed to the sun gear 680. Furthermore, the clutch 690 may be operably coupled to the shaft 691 and the carrier 686. Likewise, the second drive member 676 of the first driveline component 670 may also be attached to the carrier 686. Other portions of the transmission 616 may be similar to the embodiments discussed above.

The power system 610 may operate substantially similar to the above embodiments. Thus, the first e-machine 620 may start the engine 612 with the clutch 690 in the disengaged position and the one-way clutch 692 engaged. Once the engine 612 has started, the clutch 690 may move to the engaged position, and the one-way clutch 692 may overrun, allowing power to flow in either direction through the transmission 616.

Referring now to FIG. 10, portions of the power system 710 are shown according to additional example embodiments. The power system 710 may include several features that are similar to those of FIG. 2 except as noted below. Also, components that correspond to those of FIG. 2 are indicated with corresponding reference numbers increased by 600. The embodiment of FIG. 10 may also include one or more features of any of FIGS. 2-9. A description of those common components/features will not be repeated for purposes of brevity.

As shown, the shaft 788 of the first e-machine 720 may be connected to the ring gear 782. Also, the one-way clutch 792 may be attached to the sun gear 780 and the chassis 702. Furthermore, the clutch 790 may be operably coupled to the ring gear 782 and the planet gears 784 and/or carrier 786. Other portions of the transmission 516 may be similar to the embodiments discussed above.

The power system 710 may operate substantially similar to the above embodiments. Thus, the first e-machine 720 may start the engine 712 with the clutch 790 in the disengaged position and the one-way clutch 792 engaged. Once the engine 712 has started, the clutch 790 may move to the engaged position, and the one-way clutch 792 may overrun, allowing power to flow in either direction through the transmission 716.

The transmission may be arranged according to any of the embodiments, for example, according to the space constraints on the vehicle. The power system may be compact, for example, because the first e-machine may be used to start the engine, generate power, and to provide motoring function once the engine is started. Also, the power system may be very versatile for operations in a variety of operating conditions. Furthermore, the power system may have high manufacturability.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that any use of the terms “comprises” and/or “comprising” in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. An integrated hybrid power system for a work vehicle comprising:

an engine;

an electric machine; and a transmission including a planetary gear set with a first gear, a second gear, and a third gear and a selective transmission component having a disengaged position and an engaged position, the transmission configured to transfer mechanical power between the engine and the electric machine;

the transmission, in a first configuration and the selective transmission component in the disengaged position to allow relative rotation of each of the first gear, the second gear, and the third gear, configured to transfer mechanical power in a first direction from the electric machine to the engine to start the engine; and the transmission, in a second configuration and the selective transmission component in the engaged position to rotationally fix together two of the first gear, the second gear, and the third gear, configured to transfer mechanical power in the first direction and, alternatively, in a second direction from the engine to the electric machine after the engine is started.

2. The power system of claim 1, wherein the transmission includes a first driveline component and a second driveline component;

wherein the first driveline component has a fixed drive ratio; and wherein the second driveline component has a variable drive ratio.

3. The power system of claim 2, wherein the second driveline component has a first drive ratio in the first configuration;

wherein the second driveline component has a second drive ratio in the second configuration; and wherein the first drive ratio is lower than the second drive ratio.

4. The power system of claim 3, wherein the second drive ratio is 1:1.

5. The power system of claim 1, wherein the transmission has a first drive ratio in the first configuration and a second drive ratio in the second configuration; and wherein the first drive ratio is lower than the second drive ratio.

6. The power system of claim 1, wherein the selective transmission component includes a hydraulic clutch.

7. The power system of claim 1, further comprising a one-way transmission component attached to one of the first gear, the second gear, and the third gear; and the one-way transmission component attached to a chassis of the vehicle.

8. The power system of claim 1, wherein the electric machine is configured, in the second configuration, to provide power to brake the engine.

9. The power system of claim 1, wherein the electric machine is configured, in the second configuration, to provide mechanical power to an axle of the vehicle.

10. The power system of claim 1, wherein the electric machine is a first electric machine, and further comprising a second electric machine that is electrically connected to the first electric machine;

wherein the second electric machine is configured to provide mechanical power to an axle of the vehicle.

11. A method of operating an integrated hybrid power system of a work vehicle that includes a transmission that is disposed between an engine and an electric machine, the transmission including a planetary gear set with a first gear, a second gear, and a third gear and a selective transmission component having a disengaged position and an engaged position, the method comprising:

operating, with the transmission in a first configuration and the selective transmission component in the disengaged position to allow relative rotation of each of the first gear, the second gear, and the third gear, the electric machine as a motor to transfer mechanical power in a first direction through the transmission from the electric machine to the engine to start the engine; and changing the transmission from the first configuration to a second configuration and the selective transmission component to the engaged position to rotationally fix together two of the first gear, the second gear, and the third gear for allowing power transfer in the first direction and, alternatively, in a second direction from the engine to the electric machine after the engine is started.

12. The method of claim 11, wherein changing the transmission includes changing a drive ratio of the transmission.

13. The method of claim 12, wherein the transmission includes a first driveline component and a second driveline component;

wherein the first driveline component has a fixed drive ratio;

wherein the second driveline component has a variable drive ratio; and wherein changing the drive ratio includes changing the second driveline component from a first drive ratio to a second drive ratio, wherein the first drive ratio is lower than the second drive ratio.

14. The method of claim 13, wherein the second drive ratio is 1:1.

15. A work vehicle comprising:

an internal combustion engine;

an electric machine; and a transmission including: a planetary gear set with a first gear, a second gear, and a third gear; a selective transmission component having a disengaged position and an engaged position; a first driveline component; and a second driveline component arranged in series with the first driveline component between the internal combustion engine and the electric machine, the transmission configured to transfer mechanical power between the engine and the electric machine, the first driveline component having a fixed drive ratio, the second driveline component having a variable drive ratio;

the second driveline component, when the transmission is in a first configuration and the selective transmission component is in the disengaged position to allow relative rotation of each of the first gear, the second gear, and the third gear, configured to provide a gear reduction to the transmission for transferring mechanical power in a first direction from the electric machine to the engine to start the engine; and the second driveline component, when the transmission is in a second configuration and the selective transmission component is in the engaged position to rotationally fix together two of the first gear, the second gear, and the third gear, configured to provide a direct drive allowing the transmission to transfer mechanical power in the first direction and, alternatively, in a second direction from the engine to the electric machine after the engine is started.

16. The work vehicle of claim 15, wherein the selective transmission component is an active clutch.

17. The power system of claim 16, further comprising a passive one-way clutch attached to a chassis of the vehicle and one of the first gear, the second gear and the third gear.

* * * * *